United States Patent [19]

Shinomiya

[11] Patent Number: 5,029,987
[45] Date of Patent: Jul. 9, 1991

[54] FERROELECTRIC LIQUID CRYSTAL SHUTTER

[75] Inventor: Tokihiko Shinomiya, Nara, Japan

[73] Assignee: Sharp Kabushiki Kaisha, Osaka, Japan

[21] Appl. No.: 291,224

[22] Filed: Dec. 28, 1988

[30] Foreign Application Priority Data

Dec. 28, 1987 [JP] Japan .............................. 62-335192

[51] Int. Cl.$^5$ ............................................. G02F 1/133
[52] U.S. Cl. .................................. 350/340; 350/341; 350/350 S
[58] Field of Search ..................... 350/340, 341, 350 S, 350/339 R

[56] References Cited

U.S. PATENT DOCUMENTS

| | | | |
|---|---|---|---|
| 4,634,228 | 1/1987 | Iwasaki et al. | 350/350 S X |
| 4,644,480 | 5/1987 | Geary et al. | 350/350 S X |
| 4,723,839 | 2/1988 | Nakanowatari et al. | 350/350 S X |
| 4,792,211 | 12/1988 | Harada et al. | 350/350 S X |
| 4,820,026 | 4/1989 | Okada et al. | 350/350 S X |
| 4,879,059 | 11/1989 | Hanyu et al. | 350/340 |

Primary Examiner—Stanley D. Miller
Assistant Examiner—Anita Pellman Gross

[57] ABSTRACT

A ferroelectric liquid crystal shutter including two light transmitting substrates each having a transparent electrode formed on one surface thereof and an orientation film formed over the electrode, the substrates are arranged with their orientation films opposed to each other. A ferroelectric liquid crystal having spontaneous polarization is sandwiched between the two substrates. The orientation film of one of the substrates is a first polymer film capable of restricting to one direction the orientation of spontaneous polarization of liquid crystal molecules present in the vicinity of the interface between the film and the liquid crystal by a contact potential difference resulting from the contact therebetween. The other orientation film of the other substrate is a second polymer film capable of restricting to the one direction the orientation of spontaneous polarization of liquid crystal molecules present in the vicinity of the interface between the other orientation film and the liquid crystal by a contact potential difference resulting from the contact therebetween which is different from the first-mentioned potential difference.

12 Claims, 3 Drawing Sheets

FERROELECTRIC LIQUID CRYSTAL SHUTTER

BACKGROUND OF THE INVENTION

1. Field of the Invention

The present invention relates to ferroelectric liquid crystal shutters for use in three-dimensional stereoscopic televisions, frequency-modulatable stroboscopes, etc.

2. Description of the Prior Art

Liquid crystal shutters employing nematic liquid crystals usually have a response speed of several tens of milliseconds. Such shutters are known which have improved fall time due to a twist through 270°, or are adapted to have a response speed of about 1 msec by the two-frequency drive method. However, to obtain a shorter response time, it is suitable to use ferroelectric liquid crystals proposed by Clark and Lagerwall in (Applied Physics Letters, Vol. 36, p. 899, published in 1980. Ferroelectric liquid crystals generally in use are smectic C* phase liquid crystals which already afford response speeds of several tens of microseconds at room temperature.

The ferroelectric smectic C liquid crystal proposed by Clark et al. has a helical structure. When a cell having the liquid crystal enclosed therein is greatly decreased in thickness, the helical structure disappears, leaving only two domains which differ in optical axis. The ferroelectric liquid crystal molecules have spontaneous polarization, can be switched over between these two domains by the application of d.c. pulses and have such a memory effect that even when the voltage is turned off after the switching pulse application, the resulting state can be retained. Attempts are made to utilize these characteristics in liquid crystals of this type for use in liquid crystal shutters and large-capacity displays.

However, with liquid crystal shutters employing ferroelectric liquid crystals, the cell is likely to have two optical axes because the liquid crystal molecules therein include those having an UP state and a DOWN state due to spontaneous polarization. Generally, the optical axes can be lined up in either the UP state or DOWN state by the application of an electric field, whereas if there is zigzag disclination which is an orientation defect, there appears on opposite sides of the disclination a domain which is more stable in the UP state and a domain which is more stable in the DOWN state, and the optical axes of the cell are out of alignment.

Generally with liquid crystal shutters which are subjected only to on-off repetitions as specified, a rectangular wave is applied for driving. In the case of this waveform, however, unnecessary high d.c. voltage is continuously applied even after switching, seriously impairing the reliability of the cell. The result appears as a disturbance in orientation. Further, when a memory waveform is used for driving, in the cell which is prepared by rubbing, generally the liquid crystal becomes twisted, or the optical axis between the liquid crystal molecules being in the memory state fails to shift through an angle as large as the tilt angle of the liquid crystal, failing to give a high contrast.

Accordingly, there exists a driving method which is adapted to greatly shift the optical axis to give a high contrast by applying d.c. bias in order to maintain the optical axes after the application of a switching pulse. When the upper and lower orientation films having the same quality and treated by rubbing are provided on the respective two glass substrates for forming the cell, the cell optical axes in the UP and DOWN states are positioned generally symmetrically with respect to the rubbing axis, whereas the above method shows the drawback that when the drive voltage is applied for switching, variations in the d.c. bias for maintaining the axes shift the two axes of the cell. The shift of the two axes presents extreme difficulties in positioning the polarizing plate, further making it impossible to afford a high contrast with good stability.

SUMMARY OF THE INVENTION

The present invention, which has been accomplished in view of the foregoing situation, provides a ferroelectric liquid crystal shutter wherein the liquid crystal molecules can be arranged in one direction to give a high contrast ratio.

The present invention provides a ferroelectric liquid crystal shutter comprising two light transmitting substrates each having a transparent electrode formed on one surface thereof and an orientation film formed over the electrode. The substrates are arranged with their orientation films opposed to each other, with a ferroelectric liquid crystal having spontaneous polarization and sandwiched between the two substrates. The orientation film of one of the substrates is a first polymer film capable of restricting to one direction the orientation of spontaneous polarization of liquid crystal molecules present in the vicinity of the interface between the film and the liquid crystal by a contact potential difference resulting from the contact therebetween. The other orientation film of the other substrate is a second polymer film capable of restricting to said one direction the orientation of spontaneous polarization of liquid crystal molecules present in the vicinity of the interface between the other orientation film and the liquid crystal by a contact potential difference resulting from the contact therebetween different from the first-mentioned potential difference.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
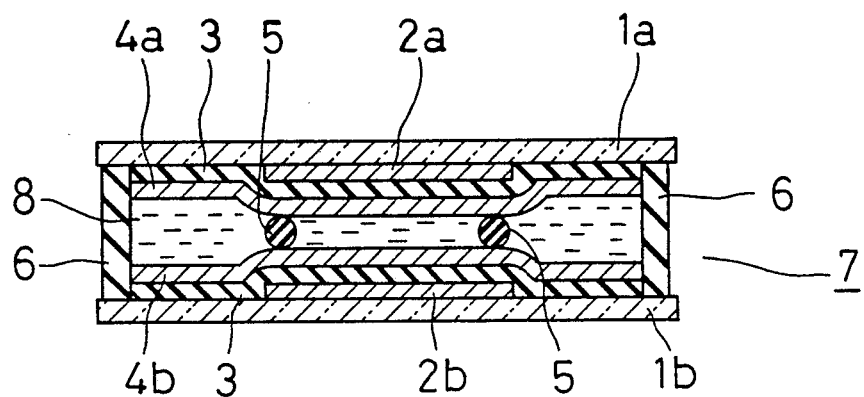
FIG. 1 is a view of a vertical section showing the construction of an embodiment of the invention.

The ferroelectric liquid crystal used in the present invention is preferably a liquid crystal material having chiral smectic C phase. Examples of such liquid crystal materials are p-decyloxybenzilidene-p'-amino-2-methylbutyl cinnamate (DOBAMBC), S-4-(6-methyl)-octylresorcylidene-4'-octylaniline (MORA-8), p-decyloxybenzilidene-p'-amino-1-methylbutyl cinnamate (DOBA-1-MBC), CS1014 (brand name, product of Chisso Corporation), etc.

The term "contact potential difference" as used herein refers to a potential difference occurring at the interface between the ferroelectric liquid crystal and a polymer film owing to the contact therebetween. Satisfactory results can be obtained when the contact potential difference is great enough to act on the spontaneous polarization of the liquid crystal molecules present in the vicinity of the interface, to restrict the orientation of spontaneous polarization of the molecules to one direction and to maintain this direction.

The contact potential difference can be expressed in terms of the magnitude of offset voltage to be applied from outside and required to cancel the asymmetry of the characteristics (memory effect, response speed, etc.) of liquid crystal molecules that would occur when different kinds of polymer films are used to serve as orientation films, i.e., the memory effect which is stable in either one of UP and DOWN states, and the disagreement between the response speed in switching from the UP to the DOWN state and the response speed in switching from the DOWN to the UP state.

The first polymer film can be made of an aromatic polyimide, aromatic polyamide, polyester or phenolic resin which has many benzene rings and in which a large number of π electrons are present.

The second polymer film can be made of an aliphatic polyimide, aliphatic polyamide, polyethylene, cellulose acetate, polyvinyl alcohol or the like which has many alkyl chains.

The aromatic polyimide can be prepared by subjecting a tetracarboxylic acid anhydride and a diamine to condensation and further subjecting the polyamidocarboxylic acid obtained as an intermediate product to condensation. Examples of useful tetracarboxylic acid anhydrides are:

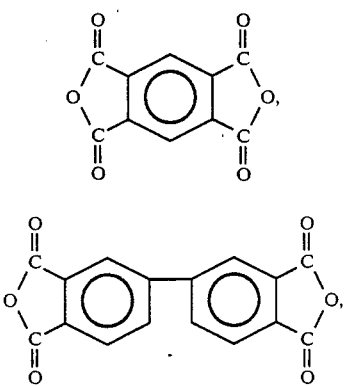

-continued

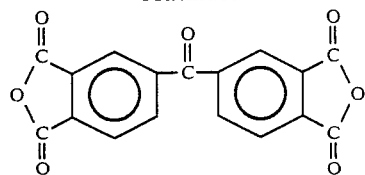

Examples of useful diamines are:

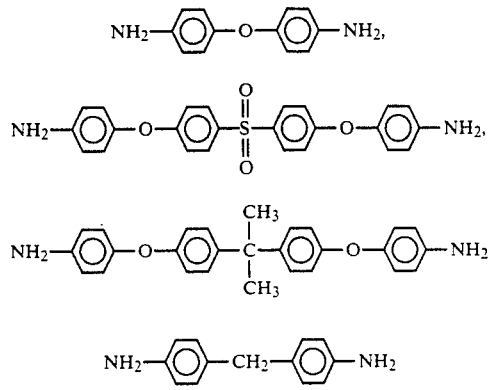

Usable as the aromatic polyamide is the polyamidocarboxylic acid obtained during the process for preparing the aromatic polyimide.

The aliphatic polyimide can be prepared by subjecting to condensation a chain tetracarboxylic acid anhydride free from any aromatic group and alicyclic group and a diamine similarly free from any aromatic group and alicyclic group, and further subjecting to condensation the polyamidocarboxylic acid obtained as an intermediate product.

Examples of useful chain tetracarboxylic acid anhydrides are:

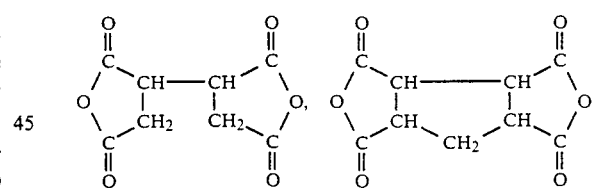

Examples of useful diamines are:

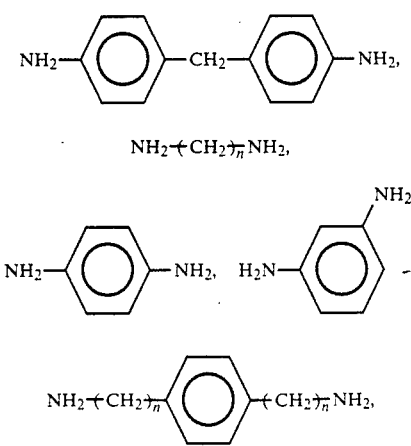

-continued

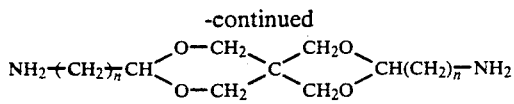

Usable as the aliphatic polyamide is the polyamidocarboxylic acid obtained during the process for preparing the aliphatic polyimide. Also usable are nylon 6, nylon 6,6, 11-nylon, etc.

Compounds exemplified above for the respective first and second polymer films are used in a suitable combination for forming these films. Examples of useful combinations are aromatic polyimide and aliphatic polyimide, aromatic polyimide and aliphatic polyamide, aromatic polyamide and aliphatic polyimide, aromatic polyimide and cellulose acetate, aromatic polyamide and cellulose acetate, etc.

The first and second polymer films have a thickness of 50 to 2000 angstroms, preferably 150 to 1000 angstroms.

With reference to FIG. 1, light transmitting substrates 1a, 1b made of glass such as float glass are formed with transparent electrodes 2a, 2b, respectively, each in the form of an ITO film and provided on one surface of the substrate. Orientation films 4a, 4b, about 500 angstroms in thickness, are formed over the electrodes 2a, 2b, respectively, with an electrode protective film 3 of $SiO_2$ or the like provided therebetween to cover the electrode. The substrates 1a, 1b are arranged one above the other with their orientation films 4a, 4b opposed to each other and are bonded to each other with epoxy resin 6, with spacers 5 interposed therebetween to form a cell 7. A ferroelectric liquid crystal 8 is then injected into the cell 7 by the vacuum injection method, and the inlet (not shown) is sealed off. A material having a chiral smectic C (SmC*) phase is used as the liquid crystal 8. In the present embodiment, CS1014 (brand name, product of Chisso Corporation) is used.

The orientation films 4a, 4b on the upper and lower substrates 1a, 1b are treated by rubbing in directions parallel to each other or antiparallel directions. The orientation films 4a, 4b are polymer films different from each other in the potential relative to the substrate and resulting from the contact of the film with the ferroelectric liquid crystal 8. For example, LQ 1800 (brand name, product of Hitachi Chemical Co., Ltd.) which is an aromatic polyimide is used for the first polymer film, and nylon 6,6 for the second polymer film.

Alternatively, JR100S (brand name, product of Nitto Electric Industrial Co., Ltd.), an aromatic polyimide, may be used for the first polymer film, and polyvinyl alcohol for the second polymer film. Also usable are a film of JIB (brand name, product of Japan Synthetic Rubber Co., Ltd.) composed of an aromatic amine and an aliphatic tetracarboxylic acid anhydride and baked at 170° C. for the first polymer film, and a JIB film baked at 300° C. for the second polymer film.

Figure 2:
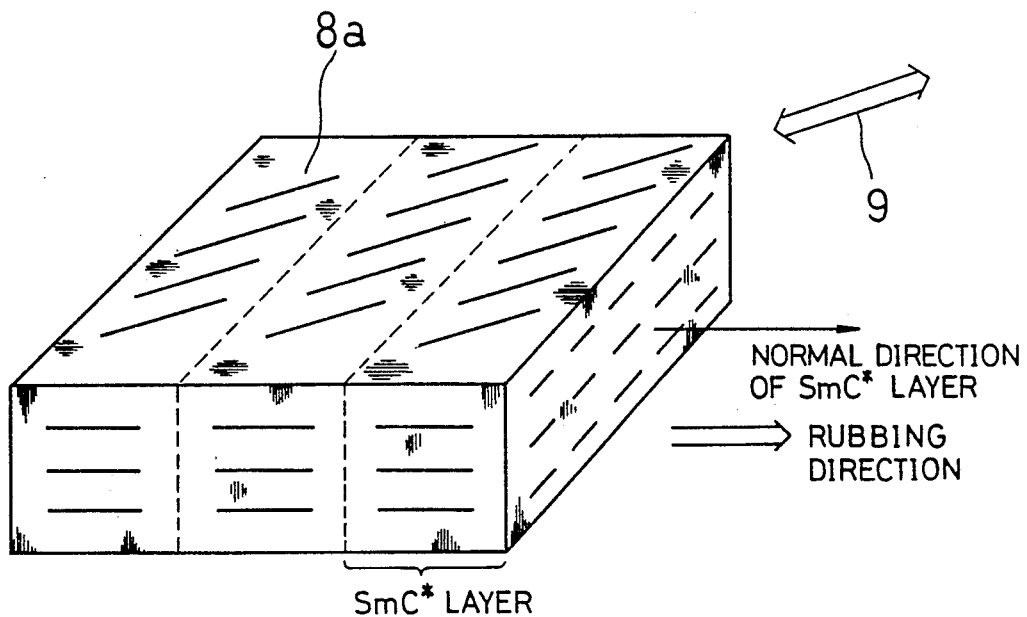
FIG. 2 is a diagram showing the orientation of molecules of a ferroelectric liquid crystal included in an embodiment of the invention.

When the ferroelectric liquid crystal 8 is injected into the cell 7, different contact potential differences occur at the interfaces between the liquid crystal 8 and the respective orientation films 4a, 4b. The potential difference acts on spontaneous polarization inside the liquid crystal molecules 8a which are present in the vicinity of each interface. Consequently, the liquid crystal molecules 8a are arranged in a substantially definite direction as seen in FIG. 2, and the long axes of the molecules 8a, i.e., the optical axes 9 thereof, are oriented in the same direction. The liquid crystal molecules 8a therefore exhibit a monostable characteristic memory effect that when an electric field is applied thereto and thereafter removed, the molecules return to the more stable arrangement along the direction of optical axes 9.

When the contact potential difference occurring at each of the interfaces between the liquid crystal 8 and the polymer films 4a, 4b is defined in terms of an offset voltage for cancelling the asymmetry of the characteristics of the liquid crystal molecules, the voltage is at least 0.05 V, preferably at least 0.1 V, in the case where the cell 7 is 2 μm in thickness. The resulting electric field is then at least 25000 V/m, preferably at least 5000 V/m. Since the contact potential differences at the interfaces are different from each other, the spontaneous polarization of the liquid crystal molecules 8a in the vicinity of the interfaces are restricted, for example, to the direction of from below the cell 7 upward.

The operation of the present embodiment will be described next with reference to FIGS. 3 to 6.

Figure 3:
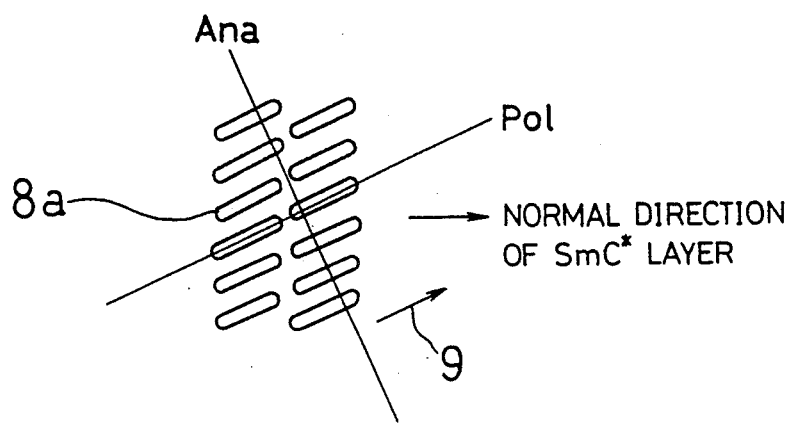
FIG. 3 is a diagram showing the relationship between the orientation of liquid crystal molecules and the absorption axes of polarizing plates which are provided for stabilizing the black level.

With reference to FIG. 3, a polarizing plate is placed, for example, on the upper surface of the cell 7 having the liquid crystal 8 injected therein as shown in FIG. 1, with the absorption axis Pol of the polarizing plate positioned approximately in parallel to the optical axes 9 of the liquid crystal molecules 8a. Another polarizing plate is provided beneath the lower surface of the cell 7 with its absorption axis Ana positioned perpendicular to the absorption axis Pol. The polarizing plates are provided for stabilizing the black level.

Figure 4:
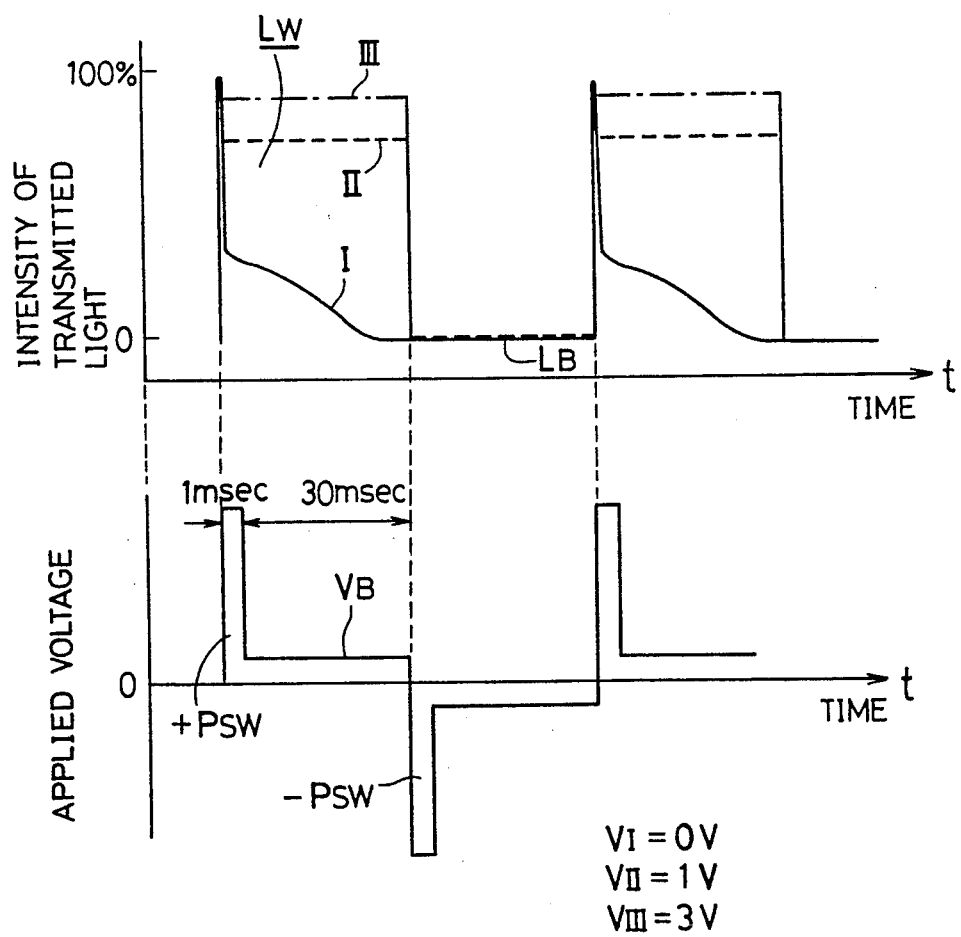
FIG. 4 is a graph showing the relationship between the waveform of drive voltage and the intensity of transmitted light involved in the operation of the embodiment with the polarizing plates set therefor as seen in FIG. 3.

FIG. 4 is a graph showing the relationship between the optical characteristics of the cell 7 in the above arrangement and the drive voltage waveform when the cell is driven. It is seen in FIG. 4 that after the application, for example, of a negative switching pulse $-P_{SW}$ for 1 msec, d.c. bias $V_B$ is applied for example for 30 msec to maintain the optical axes 9, and that even if the value of the bias $V_B$ is so changed as, for example, $V_I=0$ V, $V_{II}=1$ V and $V_{III}=3$ V, the intensity of transmitted light, $L_B$, remains almost 0% because of the above-mentioned monostable characteristics to maintain the black level with stability.

Conversely, if the d.c. bias $V_B$ is so changed as stated above after the application of a positive switching pulse $+P_{SW}$, the transmitted light intensity $L_W$ can be adjusted to levels I, II and III shown in corresponding relation to the changes in the bias $V_B$. The contrast ratio obtained in this case is 500.

Figure 5:
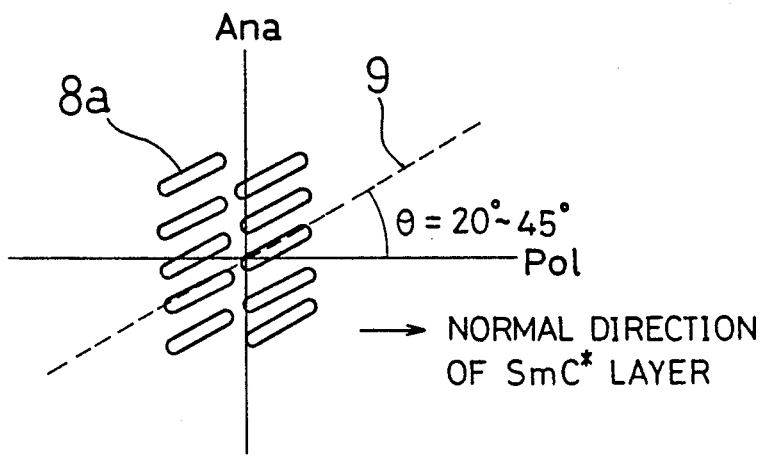
FIGS. 5 and 6 are diagrams corresponding to FIGS. 3 and 4, respectively, with polarizing plates provided for stabilizing the white level.

For stabilizing the white level, a pair of polarizing plates are arranged as follows. As shown in FIG. 5, one of the plates is disposed with its absorption axis Pol at an angle of θ with the direction of optical axes 9 of the liquid crystal molecules 8a. The other polarizing plate is positioned with its absorption axis Ana perpendicular to the axis Pol as in the above case. The angle θ is in the range of 20 to 45 degrees. The brightest white level is available when this angle θ is set to 45 degrees.

Figure 6:
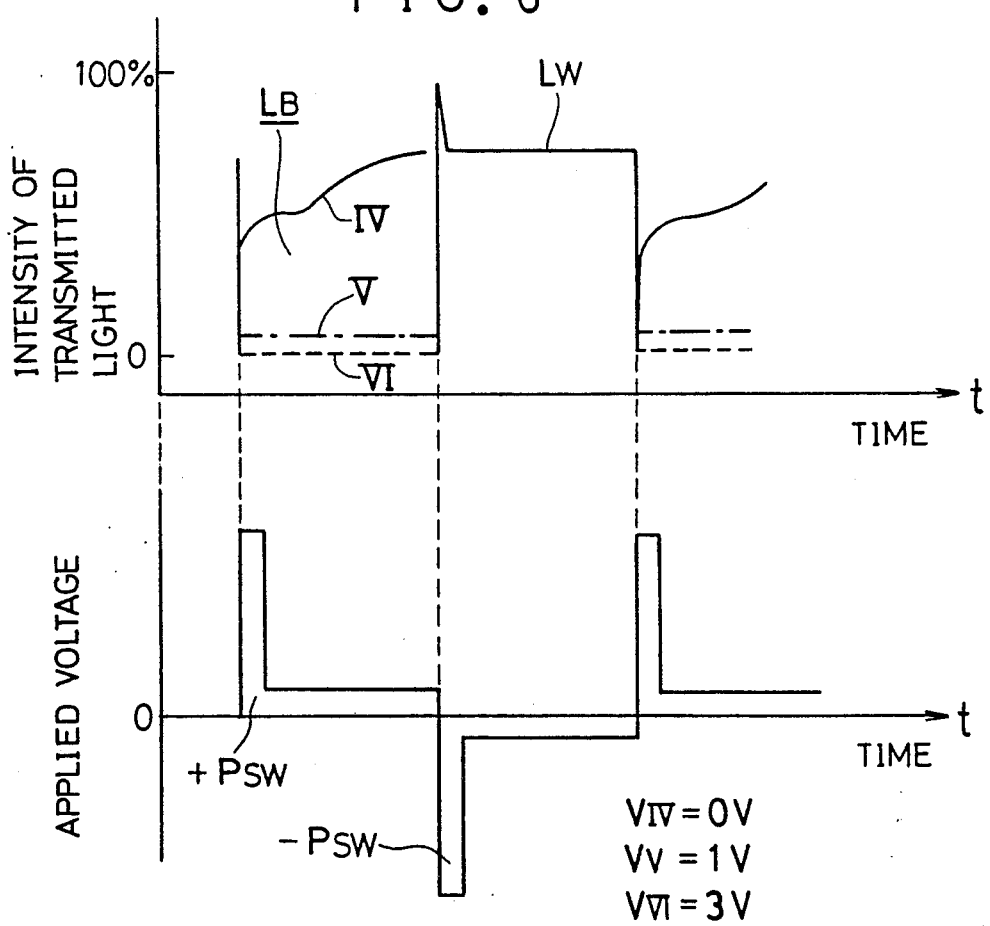

FIG. 6 shows the same relation as FIG. 4 when the tilt angle is 19 degrees, with the first-mentioned polarizing plate set at an angle θ of 30 degrees. After the application of a negative switching pulse $-P_{SW}$, the value of d.c. bias Vs is altered as $V_{IV}=0$, $V_V=1$ V and $V_{VI}=3$ V as in the case of FIg. 4. FIG. 6 reveals that despite these variations, the transmitted light intensity $L_W$ remains constant, maintaining the white level stably.

Conversely, if the d.c. bias $V_B$ is so varied as stated above after the application of a positive switching pulse $+P_{SW}$, the transmitted light intensity $L_B$ can be adjusted to levels IV, V, VI shown in corresponding relation to the voltage values $V_{IV}$, $V_V$, $V_{VI}$.

According to the present invention, the optical axes of molecules of the ferroelectric liquid crystal can be oriented in one direction, and the axes thus oriented remain almost unshifted by the d.c. bias applied for maintaining the axes after the application of the switching pulse of drive voltage. Consequently, the liquid crystal shutter of the invention is so adapted that the polarizing plates can be set in position easily based on the direction of the optical axes while affording an improved contrast ratio.

The invention being thus described, it will be obvious that the same may be varied in many ways. Such variations are not to be regarded as a departure from the spirit and scope of the invention, and all such modifications as would be obvious to one skilled in the art are intended to include within the scope of the following claims.

What is claimed is:

1. A ferroelectric liquid crystal shutter comprising:
   first and second light transmitting substrates each having a transparent electrode formed on one surface thereof and an orientation film formed over the electrode, the substrates being arranged with their orientation films opposed to each other; and
   a ferroelectric liquid crystal having spontaneous polarization sandwiched between the substrates,
   the orientation film of one of the substrates being a first polymer film restricting to one direction the orientation of spontaneous polarization of liquid crystal molecules present in the vicinity of the interface between the film and said ferroelectric liquid crystal by a first contact potential difference resulting from contact therebetween,
   the other orientation film of the other substrate being a second polymer film restricting to said one direction the orientation of spontaneous polarization of liquid crystal molecules present in the vicinity of the interface between the other orientation film and said ferroelectric liquid crystal by a second contact potential difference, resulting from contact therebetween, which is different than said first contact potential difference,
   said liquid crystal molecules exhibit a monostable state due to the properties of said orientation films, said liquid crystal molecules returning to a monostable state after application and subsequent removal of an electric field across the ferroelectric liquid crystal shutter.

2. A shutter as defined in claim 1 wherein the first polymer film is a polymer film having a large number of benzene rings and a large number of $\pi$ electrons, and the second polymer film is a polymer film having a large number of alkyl chains.

3. A shutter as defined in claim 1 wherein the first polymer film is made of an aromatic polyimide, and the second polymer film is made of an aliphatic polyimide.

4. A shutter as defined in claim 1 wherein the first polymer film is made of an aromatic polyimide, and the second polymer film is made of an aliphatic polyamide.

5. A shutter as defined in claim 1 wherein the first polymer film is made of an aromatic polyamide, and the second polymer film is made of an aliphatic polyimide.

6. A shutter as defined in claim 1 wherein the ferroelectric liquid crystal exhibits a chiral smectic C phase.

7. A ferroelectric liquid crystal apparatus comprising:
   a first light transmitting substrate having a first transparent electrode formed on a first surface and a first orientation film formed over said first transparent electrode;
   a second light transmitting substrate having a second transparent electrode formed on a first surface, in opposing relation to said first surface of said first light transmitting substrate, and a second orientation film formed over said second transparent electrode; and
   a ferroelectric liquid crystal, having spontaneous polarization, contained between said first and second light transmitting substrates,
   said first orientation film being a first polymer film restricting to one direction the orientation of spontaneous polarization of liquid crystal molecules present in the vicinity of the interface between said first orientation film and said ferroelectric liquid crystal by virtue of a first contact potential difference resulting from contact therebetween,
   said second orientation film being a second polymer film restricting to said one direction the orientation of spontaneous polarization of liquid crystal molecules present in the vicinity of the interface between said second orientation film and said ferroelectric liquid crystal by virtue of a second contact potential difference, resulting from contact therebetween, which is different than said first contact potential difference,
   said liquid crystal molecules exhibit a monostable state due to the properties of said first and second orientation films, said liquid crystal molecules returning to a monostable state after application and subsequent removal of an electric field across the ferroelectric liquid crystal apparatus.

8. The ferroelectric liquid crystal apparatus of claim 7 wherein said first polymer film is a film having a large number of benzene rings and a large number of $\pi$ electrons and said second polymer film is a polymer film having a large number of alkyl chains.

9. The ferroelectric liquid crystal apparatus of claim 7, wherein said first polymer film is made of an aromatic polyimide and said second polymer film is made of an aliphatic polyimide.

10. The ferroelectric liquid crystal apparatus of claim 7 wherein said first polymer film is made of an aromatic polyimide and said second polymer film is made of an aliphatic polyamide.

11. The ferroelectric liquid crystal apparatus of claim 7 wherein said first polymer film is made of an aromatic polyamide and said second polymer film is made of an aliphatic polyimide.

12. The ferroelectric liquid crystal apparatus of claim 7 wherein said ferroelectric liquid crystal exhibits a chiral smectic C phase.

* * * * *